US010811647B2

(12) United States Patent
Gu et al.

(10) Patent No.: US 10,811,647 B2
(45) Date of Patent: Oct. 20, 2020

(54) ELECTRIC WHEEL

(71) Applicant: INDUSTRIAL TECHNOLOGY RESEARCH INSTITUTE, Hsinchu (TW)

(72) Inventors: Huan-Lung Gu, Hualien (TW); Chia-Jui Hu, New Taipei (TW); Shao-Yu Lee, Hsinchu County (TW); Min-Chuan Wu, Taipei (TW); Yu-Yin Peng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 232 days.

(21) Appl. No.: 15/854,649

(22) Filed: Dec. 26, 2017

(65) Prior Publication Data
US 2019/0140230 A1 May 9, 2019

(30) Foreign Application Priority Data
Nov. 8, 2017 (TW) .............................. 106138670 A

(51) Int. Cl.
*B60K 1/04* (2019.01)
*H01M 2/10* (2006.01)
(Continued)

(52) U.S. Cl.
CPC ............. *H01M 2/1083* (2013.01); *B60K 1/04* (2013.01); *B60K 7/0007* (2013.01); *B60L 50/64* (2019.02);
(Continued)

(58) Field of Classification Search
CPC .. B60L 2200/24; B60L 2200/34; B60L 50/60; B60L 50/64; B60K 7/00;
(Continued)

(56) References Cited

U.S. PATENT DOCUMENTS 5,164,623 A * 11/1992 Shkondin ................ B60L 50/20
310/67 R
5,199,520 A 4/1993 Chen
(Continued)

FOREIGN PATENT DOCUMENTS

CN 2806283 Y 8/2006
CN 200945896 Y 9/2007
(Continued)

OTHER PUBLICATIONS

Leary et al., "A fundamental model of quasi-static wheelchair biomechamic" Medical Engineering and Physics, Dec. 20, 2011.
(Continued)

*Primary Examiner* — John D Walters
(74) *Attorney, Agent, or Firm* — Maschoff Brennan

(57) ABSTRACT

The disclosure is related to an electric wheel, adapted to a wheel shaft. The electric wheel includes a wheel body, a battery holder, and at least one battery module. The wheel body has a wheel hub configured to be rotatably disposed on the wheel shaft. The battery holder includes a base and at least one first electrical connector connected to each other. The base is configured to be connected to the wheel shaft and disposed side by side to the wheel hub. The base has an outer surface facing away from the wheel shaft. The at least one battery module includes at least one battery storage and at least one second electrical connector. The at least one battery storage has an inner surface in contact with the outer surface of the base. The at least one second electrical connector is detachably mounted on the at least one first electrical connector.

10 Claims, 12 Drawing Sheets

(51) Int. Cl.
  *B60K 7/00* (2006.01)
  *H01M 2/30* (2006.01)
  *H01M 2/20* (2006.01)
  *B60L 50/64* (2019.01)
  *A61G 5/04* (2013.01)

(52) U.S. Cl.
  CPC ......... *H01M 2/1077* (2013.01); *H01M 2/206* (2013.01); *H01M 2/30* (2013.01); *A61G 5/045* (2013.01); *A61G 5/047* (2013.01); *B60K 2001/045* (2013.01); *B60K 2001/0455* (2013.01); *B60K 2001/0461* (2013.01); *B60K 2007/0038* (2013.01); *B60K 2007/0092* (2013.01); *B60Y 2200/84* (2013.01); *B60Y 2400/607* (2013.01); *H01M 2220/20* (2013.01)

(58) Field of Classification Search
  CPC ............ B60K 1/04; B60K 2001/0494; H01M 2/1083; H01M 2/1077; H01M 2/206; H01M 2/30
  USPC ........................................................ 180/6.5
  See application file for complete search history.

(56) References Cited

U.S. PATENT DOCUMENTS

| | | | | |
|---|---|---|---|---|
| 5,244,411 | A * | 9/1993 | Schinke | H01M 2/1055 429/97 |
| 5,366,037 | A * | 11/1994 | Richey | A61G 5/045 180/6.5 |
| 5,427,193 | A * | 6/1995 | Avakian | A61G 5/1083 180/65.51 |
| 5,474,150 | A * | 12/1995 | Mabuchi | B60L 50/66 180/220 |
| 5,732,786 | A * | 3/1998 | Fujigaki | B60L 50/66 180/19.3 |
| 5,755,304 | A * | 5/1998 | Trigg | B60L 15/2072 180/65.51 |
| 6,092,615 | A * | 7/2000 | Pusch | A61G 5/048 180/65.51 |
| 6,095,269 | A | 8/2000 | Hosaka et al. | |
| 6,494,278 | B1 | 12/2002 | Weisz | |
| 6,769,503 | B2 | 8/2004 | Cheng | |
| D530,650 | S | 10/2006 | Azuma et al. | |
| 7,270,208 | B2 | 9/2007 | Huang | |
| 8,210,295 | B2 | 7/2012 | Kuramoto | |
| 8,348,798 | B2 * | 1/2013 | Lo | B60K 1/04 180/65.51 |
| 8,443,920 | B2 * | 5/2013 | Gomi | B62K 15/00 180/21 |
| 8,641,070 | B2 | 2/2014 | Birmanns et al. | |
| 8,991,532 | B2 * | 3/2015 | Wei | A61G 5/047 180/65.51 |
| 9,586,130 | B1 | 3/2017 | Qin | |
| 9,731,783 | B2 * | 8/2017 | Artemev | B62K 11/007 |
| 2003/0010551 | A1 | 1/2003 | Shirazawa | |
| 2003/0226699 | A1 | 12/2003 | Cheng et al. | |
| 2005/0067207 | A1 | 3/2005 | Radtke et al. | |
| 2010/0248532 | A1 * | 9/2010 | Roepke | H01R 13/642 439/504 |
| 2011/0068738 | A1 * | 3/2011 | Gomi | B62K 15/00 320/108 |
| 2011/0155490 | A1 | 6/2011 | Hsu | |
| 2011/0259658 | A1 * | 10/2011 | Huang | B60K 1/04 180/65.51 |
| 2012/0080934 | A1 * | 4/2012 | Lo | B62M 6/65 301/6.5 |
| 2012/0083375 | A1 * | 4/2012 | Lo | B62M 6/65 475/149 |
| 2012/0083376 | A1 * | 4/2012 | Lo | B60K 7/0007 475/149 |
| 2014/0083225 | A1 | 3/2014 | Downs et al. | |
| 2014/0183930 | A1 * | 7/2014 | Wei | A61G 5/1008 301/6.5 |
| 2016/0243927 | A1 * | 8/2016 | Biderman | A61B 5/0002 |
| 2016/0325801 | A1 * | 11/2016 | Artemev | B62J 25/00 |
| 2017/0259663 | A1 * | 9/2017 | Chan | B60K 1/04 |
| 2018/0294694 | A1 * | 10/2018 | Butzmann | H02K 5/04 |
| 2019/0009163 | A1 * | 1/2019 | Westfall | A63C 17/014 |
| 2019/0160937 | A1 * | 5/2019 | Yilma | B60L 50/66 |
| 2019/0315241 | A1 * | 10/2019 | Lin | B62M 6/60 |
| 2019/0329809 | A1 * | 10/2019 | MacKay | A63B 55/60 |

FOREIGN PATENT DOCUMENTS

| | | |
|---|---|---|
| CN | 104512504 A | 4/2015 |
| CN | 106039688 A | 10/2016 |
| CN | 205882836 U | 1/2017 |
| TW | 356424 B | 4/1994 |
| TW | 229458 U | 9/1994 |
| TW | 308866 U | 6/1997 |
| TW | 364356 U | 7/1999 |
| TW | 400230 B | 8/2000 |
| TW | 427155 U | 3/2001 |
| TW | 431179 U | 4/2001 |
| TW | 469824 U | 12/2001 |
| TW | I491390 U | 6/2002 |
| TW | I244917 B | 12/2005 |
| TW | M315190 U | 7/2007 |
| TW | I403426 B | 3/2012 |
| TW | M433196 U | 7/2012 |
| TW | M435922 U | 8/2012 |
| TW | 201236918 A | 9/2012 |
| TW | 201420407 A | 6/2014 |
| TW | 201422283 A | 6/2014 |
| TW | M493505 U | 1/2015 |
| TW | M503022 U | 6/2015 |
| TW | M520367 U | 4/2016 |
| TW | M521459 U | 5/2016 |
| TW | M543065 U | 6/2017 |
| TW | M543683 U | 6/2017 |
| WO | 2010/077300 A2 | 7/2010 |
| WO | 2010/077300 A3 | 8/2010 |

OTHER PUBLICATIONS

Tanohata etl a., "Battery Friendly Driving Control of Electric Power-Assisted Wheelchair Based on Fuzzy Algorithm", SICE Annual Conference 2010, Aug. 18-21, 2010.

Napoli et al., "Combined storage system for energy saving", International Symposium on Power Electronics, Electrical Drives, Automation and Motion, Jun. 14-16, 2010.

Kuo et al., "Design and development of solar powerassisted manual/electric wheelchair", The Journal of Rehabilitation Research and Development, Jan. 2014.

Yang et al., "Design and Integration of Power Wheels with Rim Motors for a Powered Wheelchair", IEEE International Conference on Applied Superconductivity and Electromagnetic Devices, Dec. 14-16, 2011.

Heo et al., "Development of power add on drive wheelchair and its evaluation", Control Conference (ASCC), Jun. 23-26, 2013.

Desai et al., "Motorized chair", Bioengineering Conference, 2000. Proceedings of the IEEE 26th Annual Northeast, Apr. 9, 2000.

"Performance Assessment of a Pushrim-Activated Power-Assisted Wheelchair Control System", IEEE Transactions on Control Systems Technology, vol. 10, No. 1, Jan. 2002.

TW Office Action dated Aug. 30, 2018 as received in Application No. 106138670.

* cited by examiner

ELECTRIC WHEEL

CROSS-REFERENCE TO RELATED APPLICATIONS

This non-provisional application claims priority under 35 U.S.C. § 119(a) on Patent Application No(s). 106138670 filed in Taiwan, R.O.C. on Nov. 8, 2017, the entire contents of which are hereby incorporated by reference.

TECHNICAL FIELD

The disclosure relates to a wheel, more particularly to an electric wheel.

BACKGROUND

Generally, an electric wheelchair has a battery module, and the electrical energy provided by the battery module is able to be transformed into the kinetic energy for driving the electric wheelchair, which is a more appropriate option for those who are physically incapable to self-propel a manual wheelchair.

In the prior art, the battery module is usually disposed on the back of a chair seat or within wheel hubs of the electric wheelchair.

SUMMARY OF THE INVENTION

One embodiment of the disclosure provides an electric wheel, adapted to a wheel shaft. The electric wheel includes a wheel body, a battery holder, and at least one battery module. The wheel body has a wheel hub configured to be rotatably disposed on the wheel shaft. The battery holder includes a base and at least one first electrical connector which are connected to each other. The base is configured to be connected to the wheel shaft and disposed side by side to the wheel hub. The base has an outer surface facing away from the wheel shaft. The at least one battery module includes at least one battery storage and at least one second electrical connector electrically connected to each other. The at least one battery storage has an inner surface in contact with the outer surface of the base, and the at least one second electrical connector is detachably mounted on the at least one first electrical connector.

According to the electric wheel as discussed above, the battery holder is disposed side by side to the wheel hub, allowing the battery module to be disposed next to the outer side of the wheel body.

In addition, the outer surface of the base contacts the inner surface of the battery storage, which enhances the structural strength of the battery module and the battery holder and ensures the electrical connection between the second electrical connector and the first electrical connector.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
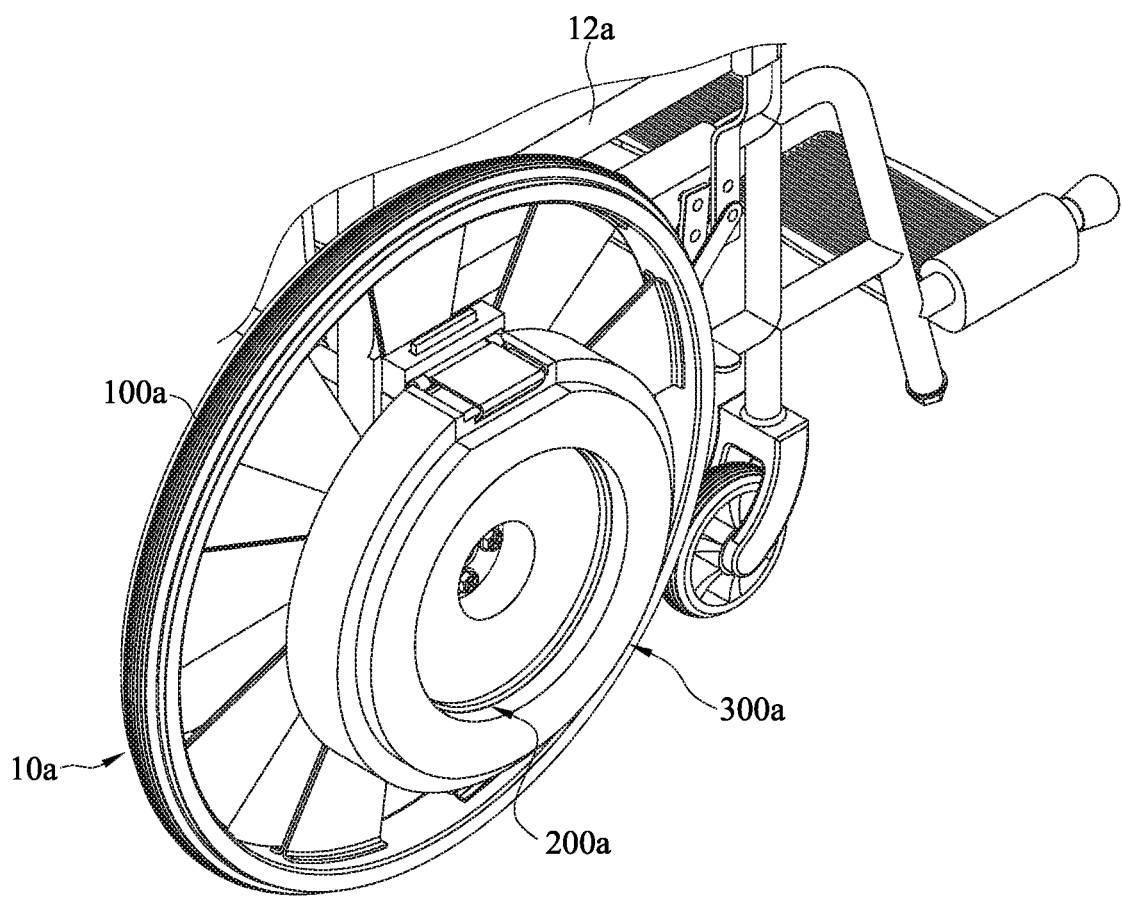
FIG. 1 is a partial perspective view of a wheelchair having an electric wheel according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
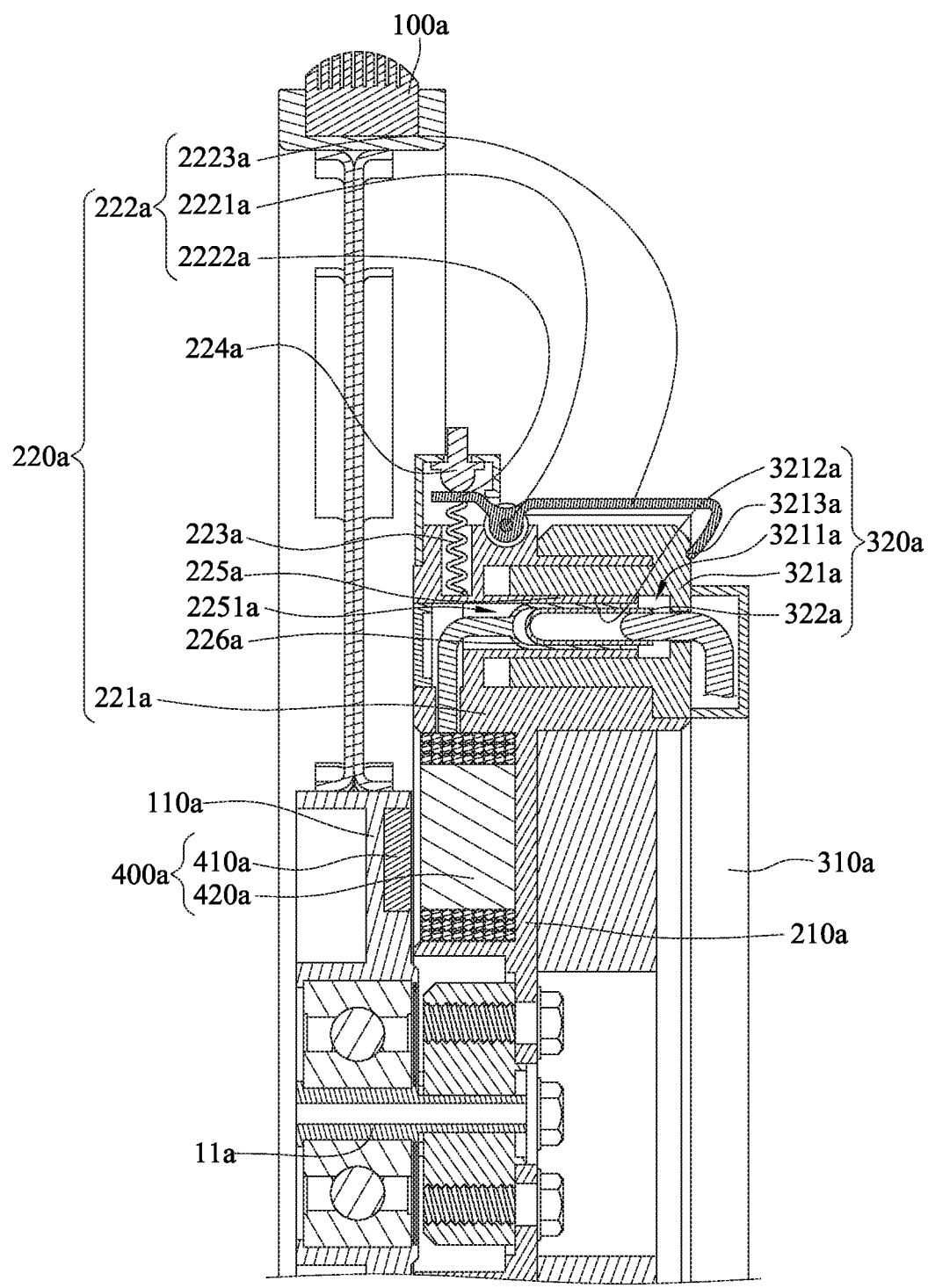
FIG. 2 is a cross-sectional view of the electric wheel in FIG. 1.
Figure 3:
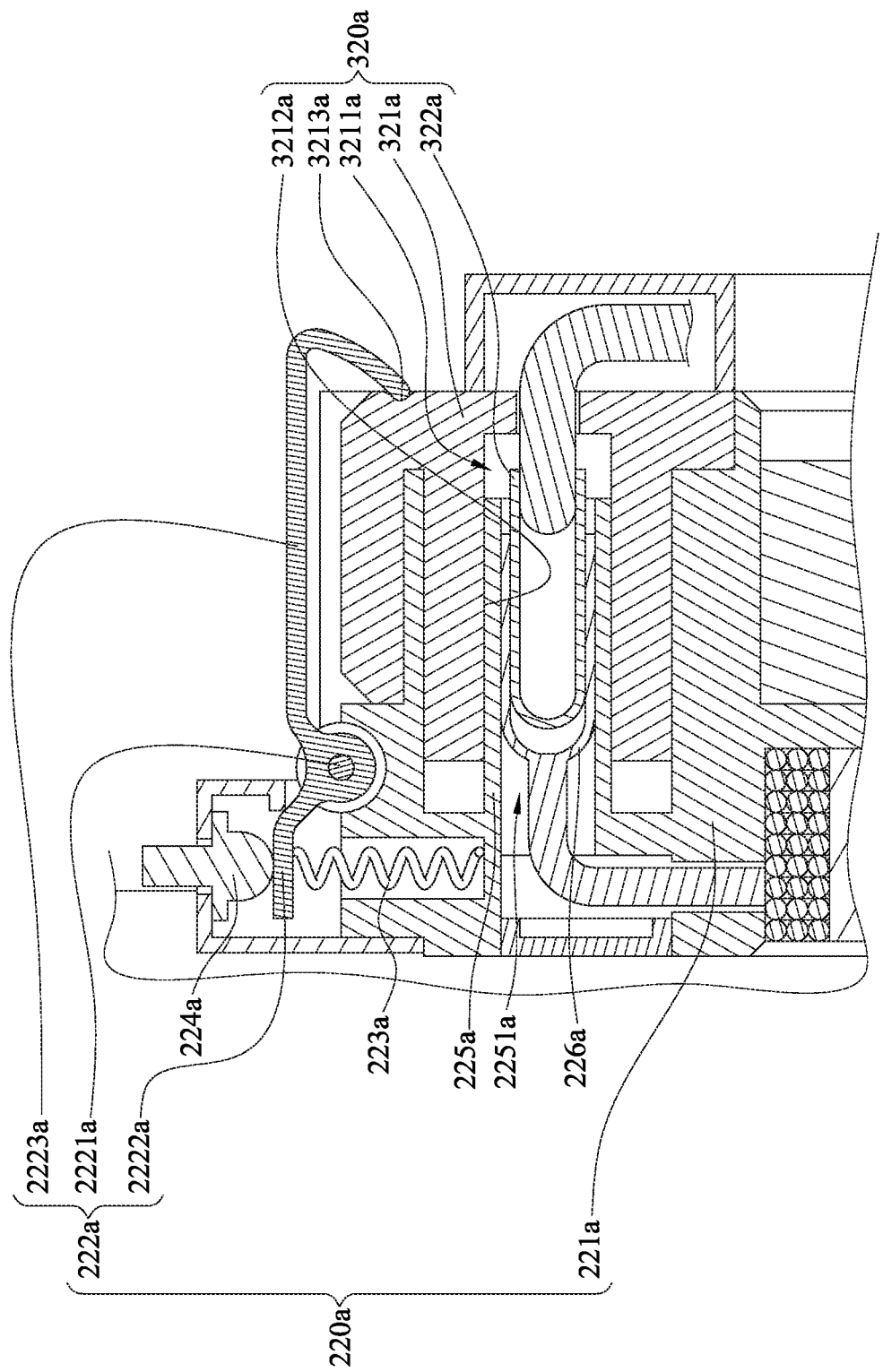
FIG. 3 is an enlarged cross-sectional view of a first electrical connector and a second electrical connector in FIG. 2.
Figure 4:
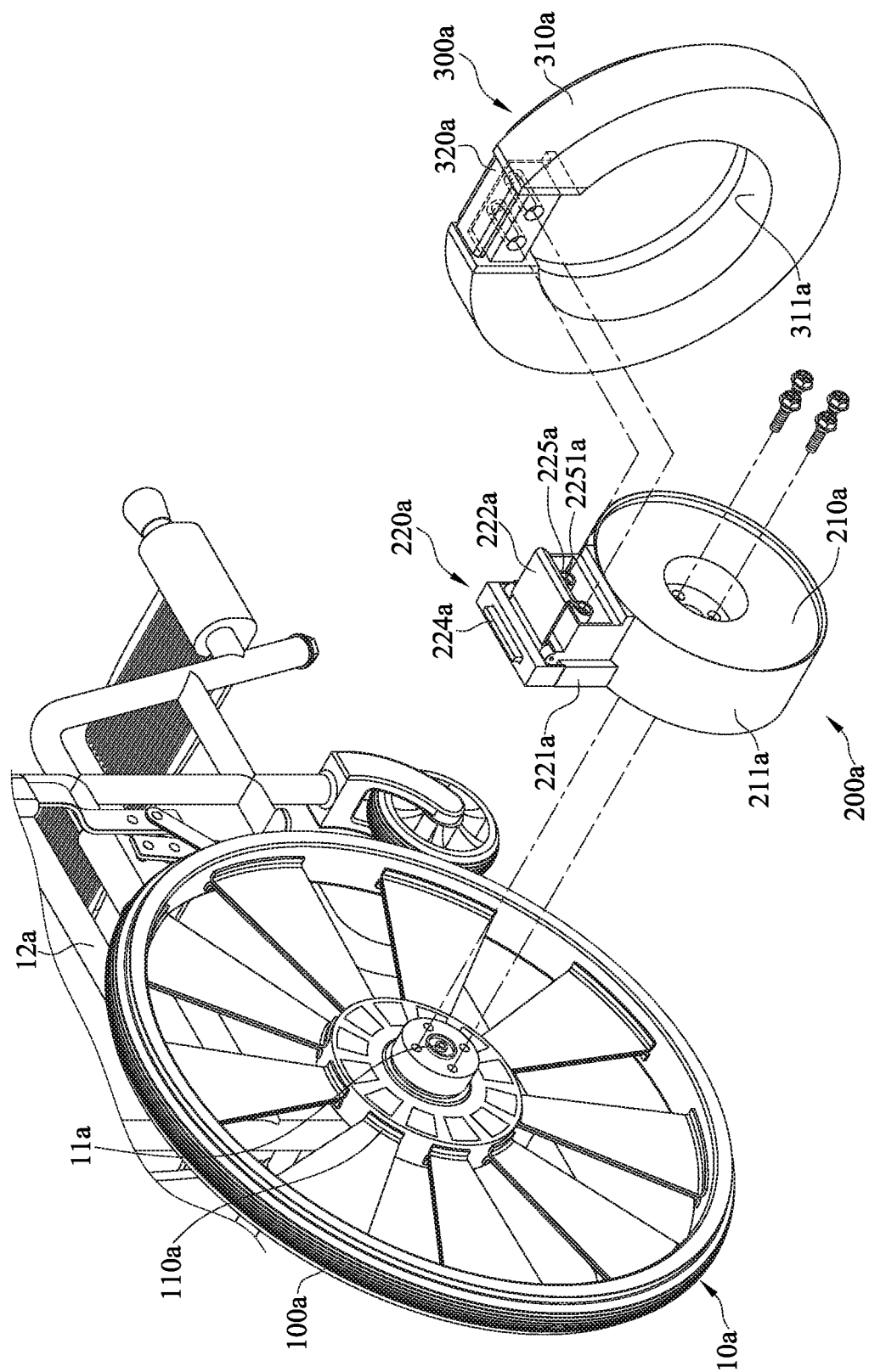
FIG. 4 is an exploded view of the wheelchair in FIG. 1 when a battery module is detached from a battery holder.

Please refer to FIG. 1 to FIG. 4. FIG. 1 is a partial perspective view of a wheelchair having an electric wheel according to a first embodiment of the disclosure. FIG. 2 is a cross-sectional view of the electric wheel in FIG. 1. FIG. 3 is an enlarged cross-sectional view of a first electrical connector and a second electrical connector in FIG. 2. FIG. 4 is an exploded view of the wheelchair in FIG. 1 when a battery module is detached from a battery holder As shown in FIG. 1, this embodiment provides two electric wheels 10a, and the two electric wheels 10a are adapted to be disposed on a wheel shaft 11a and respectively located on two opposite sides of a chair 12a so as to form an electric wheelchair. The electric wheel 10a includes a wheel body 100a, a battery holder 200a, a battery module 300a and a driving module 400a.

The wheel body 100a has a wheel hub 110a pivoted on the wheel shaft 11a. The battery holder 200a includes a base 210a and a first electrical connector 220a which are connected to each other. The base 210a is, for example, a barrel-shaped object. The base 210a is disposed on the wheel shaft 11a, and is located side by side to a side far away from the chair 12a of the wheel hub 110a. The base 210a has an outer surface 211a facing away from the wheel shaft 11a. The first electrical connector 220a includes a first seat 221a, a hook 222a, an elastic member 223a, a button 224a, two pillars 225a and two electrical terminals 226a. The first seat 221a is connected to the base 210a. The hook 222a includes a pivoting part 2221a, a press part 2222a and a hooking part 2223a. The pivoting part 2221a is located between and connected to the press part 2222a and the hooking part 2223a, and the pivoting part 2221a is pivoted to the first seat 221a. Two opposite sides of the elastic member 223a are respectively pressing against the press part 2222a and the first seat 221a so as to maintain the hooking part 2223a in a fixing position. The button 224a is in contact with a side of the press part 2222a opposite to the elastic member 223a. Two pillars 225a are disposed on the first seat 221a, and each of the pillars 225a has a first slot 2251a. The electrical terminals 226a are respectively located in the first slots 2251a.

In this embodiment, the shape of the battery module 300a is a ring-shaped object. The battery module 300a includes a battery storage 310a and a second electrical connector 320a. The battery storage 310a is electrically connected to the second electrical connector 320a, and the battery storage 310a has an inner surface 311a. The second electrical connector 320a includes a second seat 321a and two electrical pins 322a. Two opposite sides of the second seat 321a are connected to the two ends of the battery storage 310a. The second seat 321a has two second slots 3211a, two annular inner walls 3212a, and a fixing slot 3213a. The two second slots 3211a are respectively surrounded by the two annular inner walls 3212a, and the two electrical pins 322a are respectively located in the two second slots 3211a.

The outer surface 211a of the base 210a is surrounded by and in contact with the inner surface 311a of the battery storage 310a. The second seat 321a is detachably disposed on the first seat 221a, and the electrical pins 322a are detachably plugged into the first slots 2251a so as to electrically connected to the two electrical terminals 226a, and such that the two pillars 225a are respectively located in the two second slots 3211a and respectively pressed by the annular inner walls 3212a. That is, the pillars 225a protect the portions where the two electrical terminals 226 are in contact with the two electrical pins 322, and the annular inner walls 3212a become the secondary protection for the electrical terminals 226 and the electrical pins 322, thereby preventing water from entering into the electric wheel 10a. The press part 2222a of the hook 222a is maintained in position by the elastic member 223a, such that hooking part 2223a is maintained in the fixing position of hooking the fixing slot 3213a.

The driving module 400a includes a rotor 410a and a stator 420a. The rotor 410a is disposed on a side near the base 210a of the wheel hub 110a. The stator 420a is disposed on a side near the wheel hub 110a of the base 210a, and is electrically connected to the first electrical connector 220a. The stator 420a is configured to produce the magnetic effect with the rotor 410a for driving the rotor 410a to rotate with respect to stator 420a and driving the wheel body 100a and wheel hub 110a to rotate.

Figure 5:
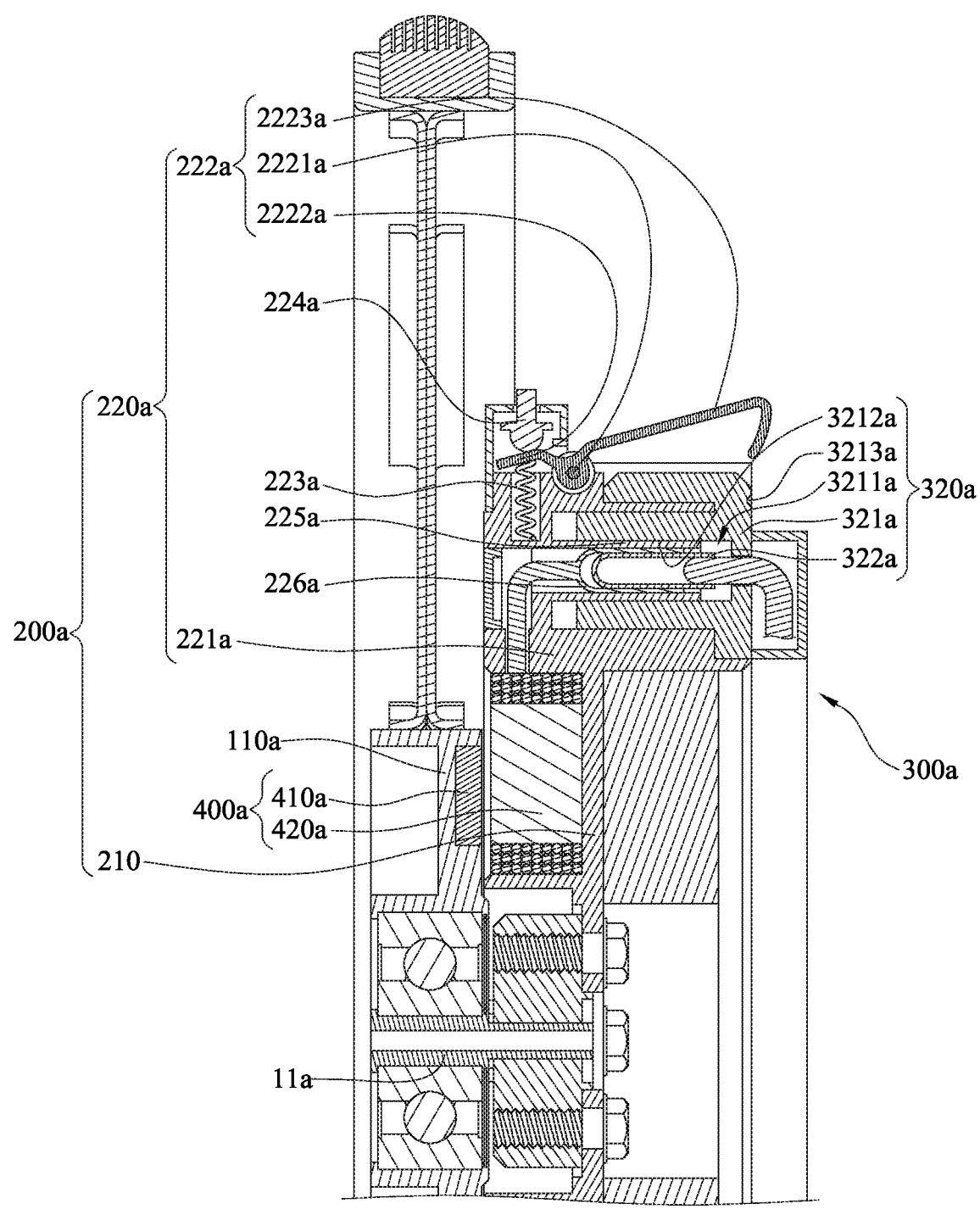
FIG. 5 is a cross-sectional view of the electric wheel in FIG. 1 when a hook is released.

Please further refer FIG. 5 with former figures together. FIG. 5 is a cross-sectional view of the electric wheel in FIG. 1 when a hook is released. When the battery module 300a runs out of energy, it can be detached by pressing the button 224a. In detail, when the button 224a is pressed, the hooking part 2223a is tilted by the button 224a, such that the hooking part 2223a is forced to be detached from the fixing slot 3213a to be in a released position. By doing so, the second electrical connector 320a is allowed to be detached from the first electrical connector 220a. That is, the battery module 300a is able to be detached from the battery holder 200a. Then, when the batter module 300a is detached and recharged, it can be reloaded when the hooking part 2223a is in the released position. When the batter module 300a is in position, the second electrical connector 320a is mounted on the first electrical connector 220a, and then the button 224a is released so that the elastic member 223a would spring the press part 2222a of the hook 222a moving upward to make the hooking part 2223a to hook the fixing slot 3213a. At this moment, the battery module 300a is fixed in position on the battery holder 200a.

In this embodiment, the battery holder 200a is disposed side by side to the wheel hub 110a, thus the battery module 300a is able to be disposed on the outer side of the wheel body 100a. Therefore, the battery capacity of the battery module 300a is allowed to be increased because the space along the radial direction of the wheel shaft is not limited by the wheel hub, such that the electric wheel can be equipped with larger battery module without largely increasing the overall size.

In addition, by the cooperation of the hook 222a, the elastic member 223a and the button 224a, the battery module 300a can be easily detached from the battery holder 200a, which is beneficial for those who are physically incapable to change the battery module 300a.

Moreover, the outer surface 211a of the base 210a is pressed and surrounded by the inner surface 311a of the battery storage 310a, which enhances the structural strength of the battery module 300a and the battery holder 200a and ensures the electrical connection between the second electrical connector 320a and the first electrical connector 220a.

Figure 6:
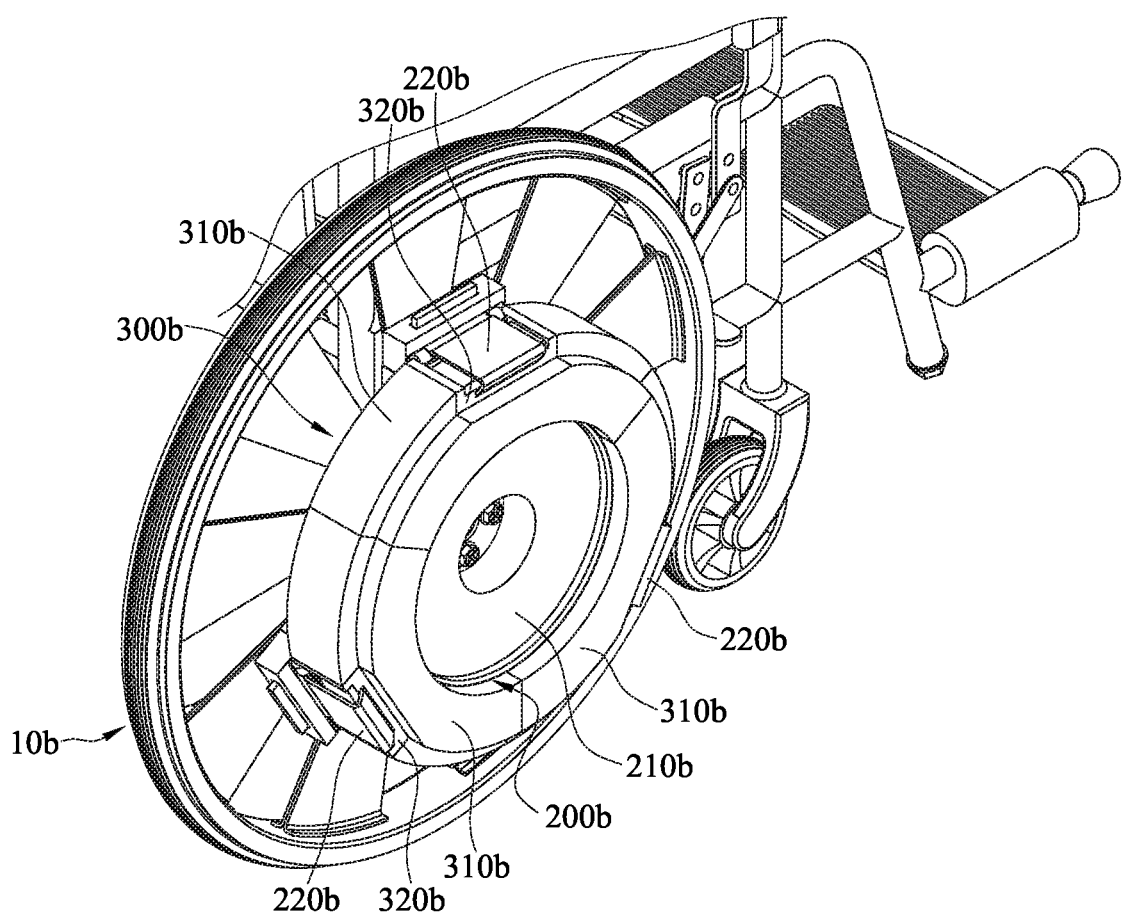
FIG. 6 is a perspective view of an electric wheel comprising a battery module and a battery holder according to a second embodiment of the disclosure.

In addition, the numbers of the battery storage 310a, the second electrical connector 320a, and the first electrical connector 220a are not restricted. For example, please refer to FIG. 6. FIG. 6 is a perspective view of an electric wheel comprising a battery module and a battery holder according to a second embodiment of the disclosure This embodiment provides an electric wheel 10b having a battery holder 200b and a battery module 300b. The battery holder 200b includes three first electrical connectors 220, and the battery module 300b includes three battery storages 310b and three second electrical connectors 320b. A base 210b of the battery holder 200b is surrounded by the three battery storages 310b together, and each of the three battery storages 310b is connected to a second electrical connector 320b. The three second electrical connectors 320b are respectively mounted on the three first electrical connectors 220b.

Since the battery module 300b has three battery storages 310b and the battery holder 200b has three first electrical connectors 220b respectively corresponding to the second electrical connectors 320b on the 310b, it permits user to carry one, two or three battery storages 310b so as to adjust the battery capacity of the electric wheelchair according to actual requirements.

In addition, the numbers of the first electrical connectors 220b, the battery storages 310b and the second electrical connectors 320b are not restricted. In some other embodiments, each number of the first electrical connector, the battery storage and the second electrical connector may be two, larger than three, or can be adjusted to another number according to actual requirements.

Furthermore, the present disclosure is not limited to the manner of disposing the battery module 300a as discussed in the previous embodiments.

Figure 7:
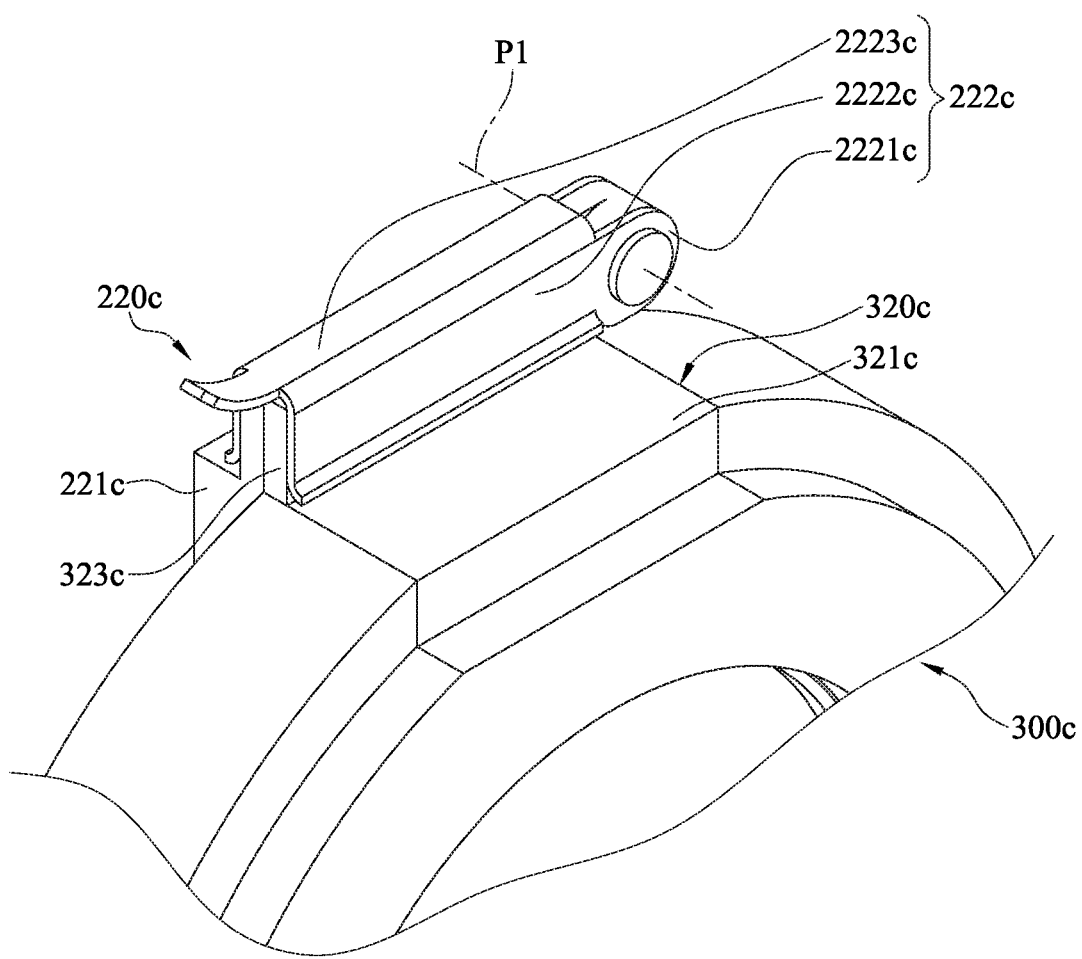
FIG. 7 is a perspective view of a fixing part of an electric wheel in a fixing position according to a third embodiment of the disclosure.
Figure 8:
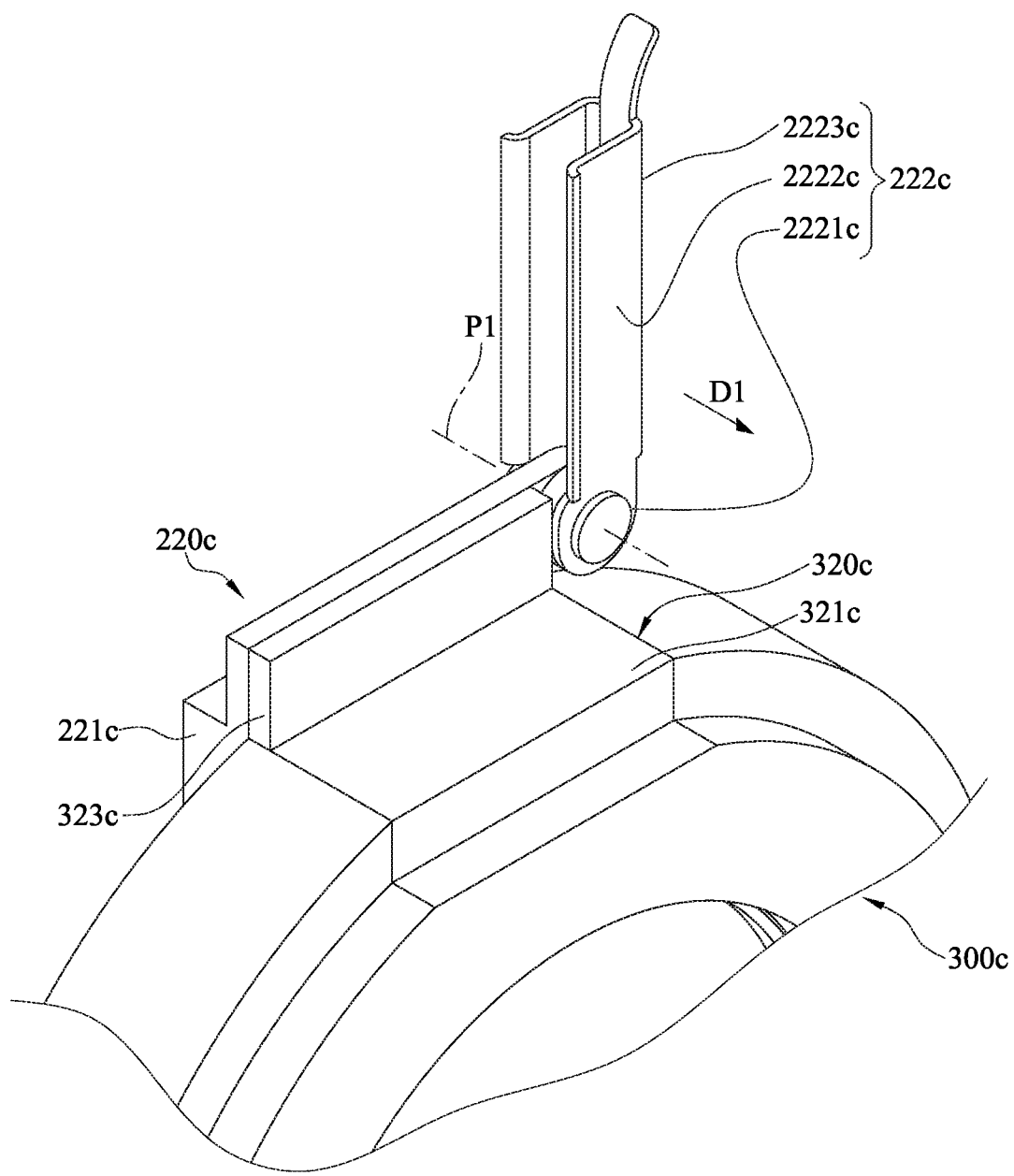
FIG. 8 is a perspective view of the fixing part of the electric wheel in a released position according to the third embodiment of the disclosure.

For example, please refer to FIG. 7 and FIG. 8. FIG. 7 is a perspective view of a fixing part of an electric wheel in a fixing position according to a third embodiment of the disclosure. FIG. 8 is a perspective view of the fixing part of the electric wheel in a released position according to the third embodiment of the disclosure.

This embodiment provides a battery module 300c having a second electrical connector 320c. The second electrical connector 320c includes a second seat 321c and a protrusion 323c. The protrusion 323c protrudes from the second seat 321c in a radial direction of the wheel shaft (e.g. the wheel shaft 11a in FIG. 2). Moreover, this embodiment provides a first electrical connector 220c including a fixing member 222c. The fixing member 222c includes a pivoting part 2221c, a fixing part 2222c and an operating part 2223c. The pivoting part 2221c is pivoted to the first seat 221c, and the fixing part 2222c is connected to the pivoting part 2221c. The operating part 2223c is connected to the fixing part 2222c. The pivoting part 2221c is pivotable about an axis P1 parallel to the axis of the wheel shaft (e.g. the wheel shaft 11a in FIG. 2), such that the fixing part 2222c has a fixing position and a released position. When the fixing part 2222c is in the fixing position, the protrusion 323c is clamped and pressed by the fixing part 2222c. The fixing part 2222c is able to be moved to the released position by moving the operating part 2223c. When the fixing part 2222c is moved to the released position, it is detached from the protrusion 323c. At this moment, the battery module 300c is allowed to be detached along a direction D1.

Figure 9:
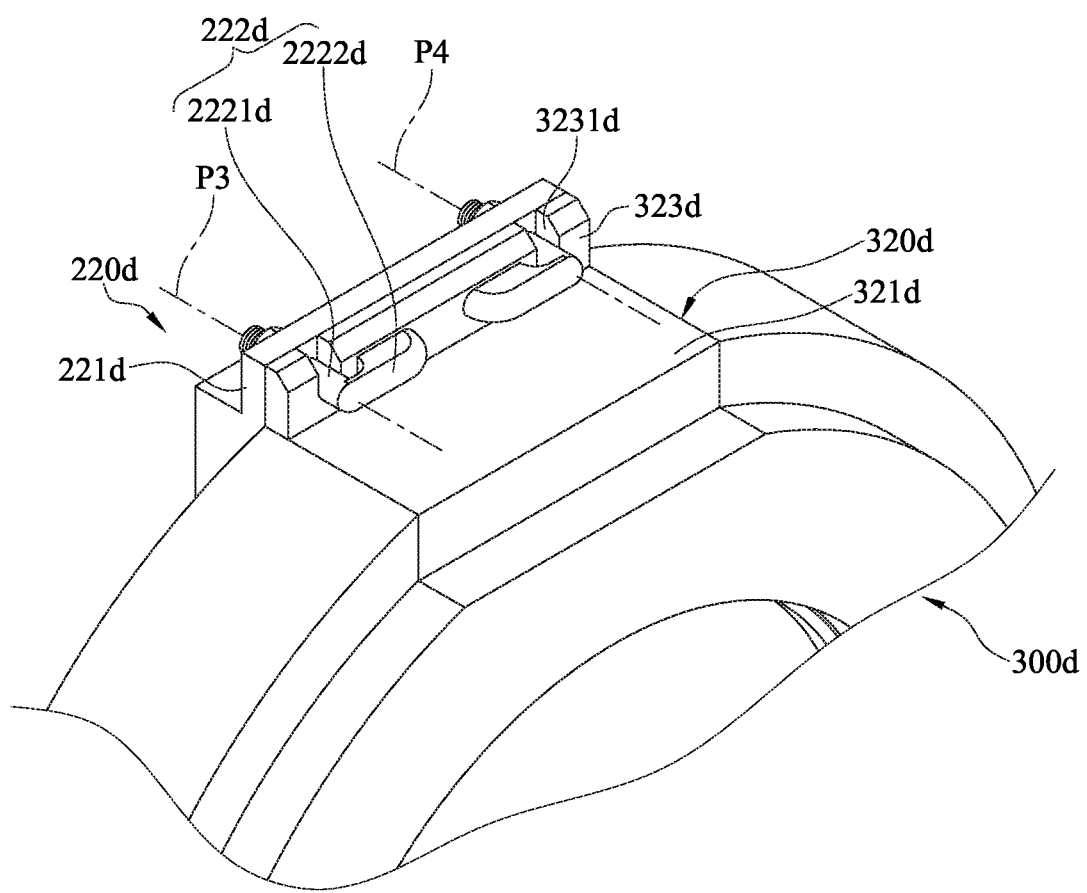
FIG. 9 is a perspective view of a fixing part of an electric wheel in the fixing position according to a fourth embodiment of the disclosure.
Figure 10:
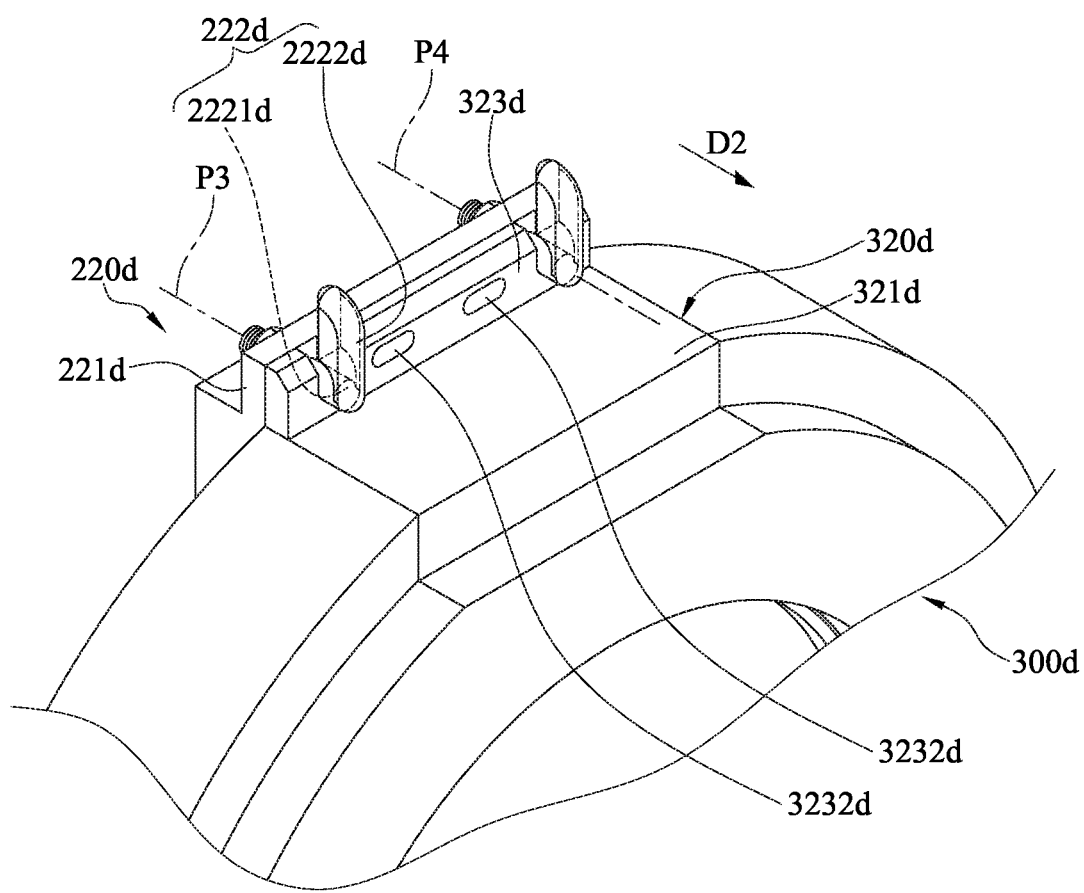
FIG. 10 is a perspective view of the fixing part of the electric wheel in the released position according to the fourth embodiment of the disclosure.

Please refer to FIG. 9 and FIG. 10. FIG. 9 is a perspective view of a fixing part of an electric wheel in the fixing position according to a fourth embodiment of the disclosure. FIG. 10 is a perspective view of the fixing part of the electric wheel in the released position according to the fourth embodiment of the disclosure.

This embodiment provides a battery module 300d includes a second electrical connector 320d including a second seat 321d and a protrusion 323d. The protrusion 323d protrudes from the second seat 321d in a radial direction of the wheel shaft (e.g. the wheel shaft 11a in FIG. 2). The protrusion 323d has two recessed slots 3231d and two fixing holes 3232d. The two fixing holes 3232d are located between the two recessed slots 3231d. Moreover, the first electrical connector 220d further includes two fixing members 222d. Each of the two fixing member includes a pivot shaft 2221d and a fixing part 2222d. The two pivot shafts 2221d are pivoted to the first seat 221d, and the two fixing parts 2222d respectively protrudes from the two pivot shafts 2221d in two radial directions of the two pivot shafts 2221d. Thus, the two fixing parts 2222d are respectively rotatable along two axes P3, P4 of the two pivot shafts 2221d so as to be moved to a fixing position and a released position. When the two pivot shafts are respectively located in the recessed slots, and the two fixing parts 2222d are in the fixing position, the two fixing parts 2222d are respectively fixed in the two fixing holes 3232d, such that the protrusion 323d is fixed to the first seat 221d. The two fixing parts 2222d can be moved to the released position, when the two fixing parts 2222d are moved to the released position along the two axes P3 and P4, the two fixing parts 2222d are respectively detached from the two fixing holes 3232d, such that the pivot shafts are able to be removed from the two recessed slots in a direction D2.

Figure 11:
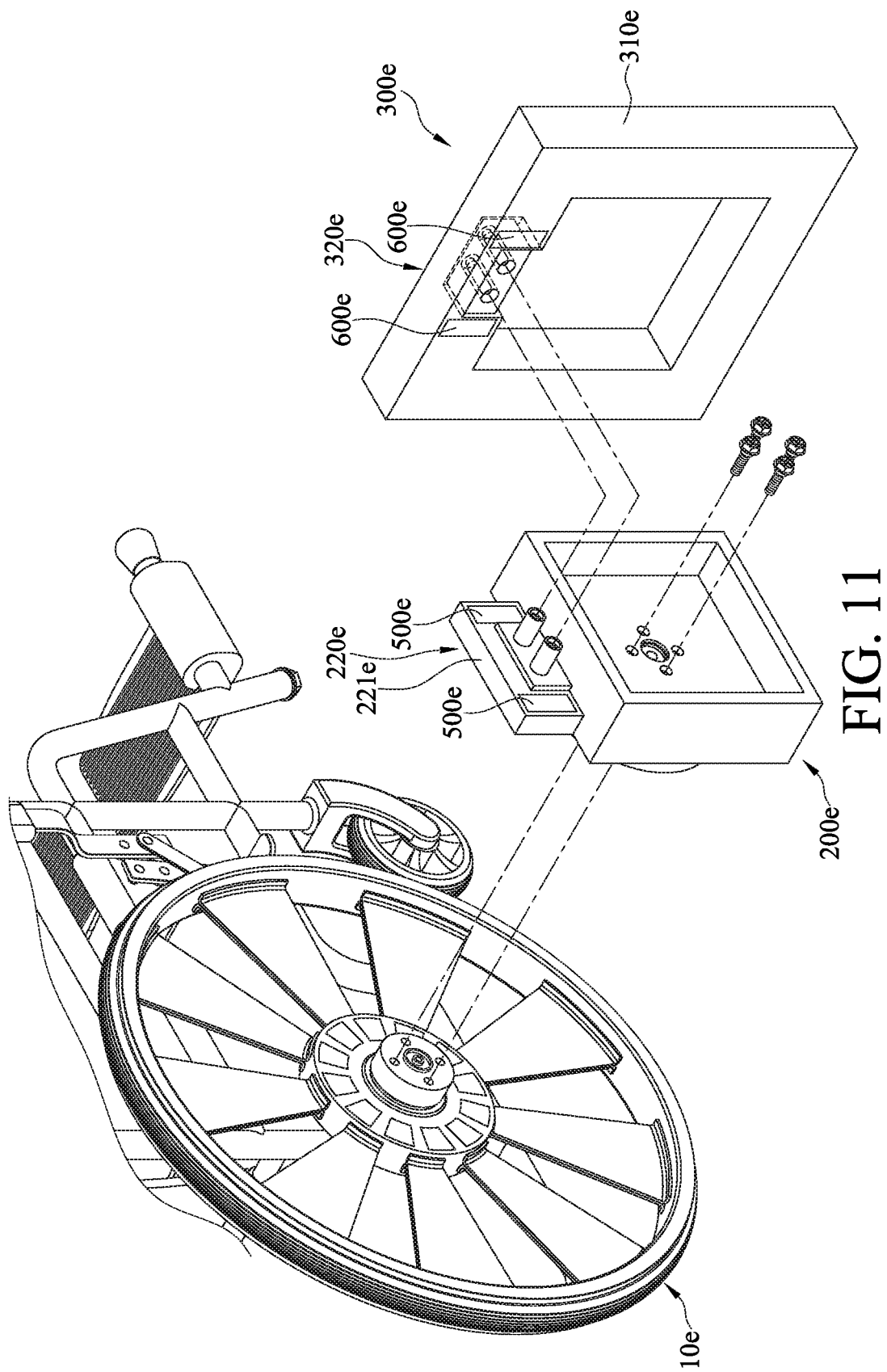
FIG. 11 is a perspective view of an electric wheel comprising a battery module and a battery holder according to a fifth embodiment of the disclosure.

Moreover, the shape of the battery holder is not restricted. For example, please refer to FIG. 11. FIG. 11 is a perspective view of an electric wheel comprising a battery module and a battery holder according to a fifth embodiment of the disclosure.

This embodiment provides an electric wheel 10e including a battery module 300e in a square ring shape and a battery holder 200e in a square shape. The electric wheel 10e further includes two first magnets 500e and two second magnets 600e. The two first magnets 500e are disposed on the first seat 221e of the battery holder 200e, and the two second magnets 600e are disposed on the battery storage 310e. The two second magnets 600e and the first magnets 500e are attractive to each other for connecting the first electrical connector 220e and the second electrical connector 320e.

Figure 12:
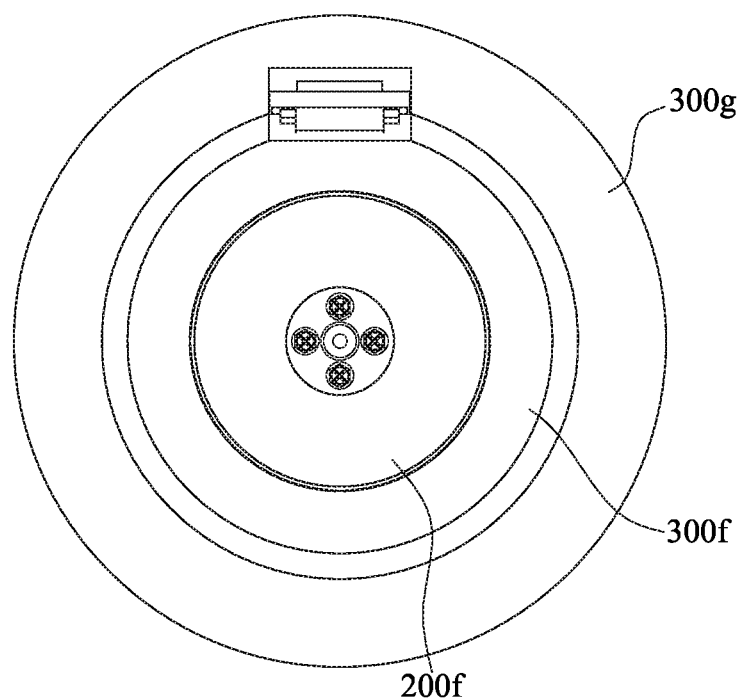
FIG. 12 a front view of a battery module according to a sixth embodiment of the disclosure.

Furthermore, the number of the battery module is not restricted. For example, please refer to FIG. 12. FIG. 12 a front view of a battery module according to a sixth embodiment of the disclosure.

This embodiment provides two battery modules 300f, 300g which are different in size, the battery modules 300g is sleeved on the battery module 300f. Since the space along the radial direction of the wheel shaft (e.g. the wheel shaft in FIG. 2) of the battery holder 200f is not limited. Therefore, it is possible to dispose more battery module on the battery holder 200f according to the requirement of the battery capacity.

According to the electric wheel as discussed above, the base of the battery holder is disposed side by side to the wheel hub so that the battery module is able to be disposed on the outer side of the wheel body. Therefore, it is easily to change the battery module for those physically incapable people, and the battery capacity of the battery module is allowed to be increased because the space along the radial direction of the wheel shaft is not limited by the wheel hub. As a result, it is possible to dispose more battery module on the electric wheel without largely increasing the overall size.

In addition, the battery module can be easily detached from the battery holder, which is beneficial for those who are physically incapable to change the battery module.

Moreover, the structural strength of the battery module and the battery holder ensures the electrical connection between the second electrical connector and the first electrical connector.

Furthermore, in some other embodiments, because the electric wheel can have more than one battery modules to the increase the battery capacity according to actual requirements.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An electric wheel, adapted to a wheel shaft, comprising:
a wheel body having a wheel hub configured to be rotatably disposed on the wheel shaft;
a battery holder comprising a base and at least one first electrical connector which are connected to each other, the base configured to be connected to the wheel shaft and disposed side by side to the wheel hub, the base having an outer surface facing away from the wheel shaft; and
at least one battery module comprising at least one battery storage and at least one second electrical connector electrically connected to each other, the at least one battery storage having an inner surface radially surrounds and in contact with the outer surface of the base, wherein the base of the battery holder and the at least one battery storage radially surrounding thereon are radially arranged on part of the wheel shaft protruding outwards from the wheel hub, and the at least one second electrical connector detachably mounted on the at least one first electrical connector.

2. The electric wheel according to the claim 1, wherein the at least one battery module is in a ring shape.

3. The electric wheel according to the claim 1, wherein the at least one battery module is in a square ring shape.

4. The electric wheel according to the claim 1, wherein the number of the at least one first electrical connector is plural, the number of the at least one battery storage is plural, the number of the at least one second electrical connector is plural, the battery holder is surrounded by the battery storages, the battery storages are respectively connected to the second electrical connectors, and the second electrical connectors are respectively mounted on the first electrical connectors.

5. The electric wheel according to the claim 1, wherein the at least one first electrical connector comprises a first seat, two pillars and two electrical terminals, the first seat is connected to the base, the two pillars are disposed on the first seat, each of the two pillars is hollow and has a first slot, the two electrical terminals are respectively located in the two first slots, the at least one second electrical connector comprises a second seat and two electrical pins, two ends of the second seat are connected to the at least one battery storage, the first seat is detachably disposed on the second seat, the second seat has two second slots and two annular inner walls respectively forming the two second slots, the two electrical pins are respectively located in the two second slots, the two electrical pins are detachably plugged into the two first slots to respectively electrically connected to the two electrical terminals, and when the two electrical pins are plugged into the two first slots, the two pillars are respectively located in the two second slots and respectively pressed by the two annular inner walls.

6. The electric wheel according to the claim 5, wherein the second seat further has a fixing slot, the at least one first electrical connector further comprises a hook and an elastic member, the hook comprises a pivoting part, a press part and a hooking part, the pivoting part is located between and connected to the press part and the hooking part, the pivoting part is pivoted to the first seat, and two opposite ends of the elastic member respectively press against the press part and the first seat in order to keep the hooking part hooking the fixing slot.

7. The electric wheel according to the claim 5, the electric wheel further comprises two first magnets and two second magnets, the two first magnets are disposed on the first seat, the two second magnets are disposed on the at least one battery storage, and the two second magnets and the two first magnets are attracted to each other for positioning the connection between the at least one first electrical connector and the at least one second electrical connector.

8. The electric wheel according to the claim 5, wherein the at least one second electrical connector further comprise a protrusion, the protrusion protrudes from the second seat in a radial direction of the wheel shaft, the at least one first electrical connector further comprises a fixing member, the fixing member comprises a pivoting part, a fixing part and an operating part, the pivoting part is pivoted to the first seat, the fixing part is connected to the pivoting part, the operating part is connected to the fixing part, the pivoting part is pivotable about an axis parallel to the axis of the wheel shaft, such that the fixing part is movable to a fixing position; when the fixing part is in the fixing position, the protrusion is fixed between the fixing part and the first seat.

9. The electric wheel according to the claim 5, wherein the at least one second electrical connector further comprises a protrusion, the protrusion protrudes from the second seat in a radial direction of the wheel shaft, and the protrusion has two recessed slots and two fixing holes, the two fixing holes are located between the two recessed slots, the at least one first electrical connector further comprises two fixing members, each of the two fixing members comprises a pivot shaft and a fixing part, the two pivot shafts are pivoted to the first seat, the two fixing parts respectively protrude from the pivot shafts in two radial directions of the two pivot shafts, the two fixing parts are pivotable about the two axes of the two pivot shafts so as to be moved to a fixing position or a released position; when the two fixing parts are in the fixing position, the two fixing parts are respectively fixed in the two fixing holes, such that the protrusion is fixed to the first seat; when the fixing parts are moved to the released position, the two fixing parts are respectively detached from the two fixing holes, allowing the protrusion is detachable from the first seat.

10. The electric wheel according to the claim 1, wherein the number of the at least one battery module is two, the battery modules are different in size, one of the battery modules is sleeved on the other battery module.

* * * * *